United States Patent
Rodrigues

(10) Patent No.: US 11,870,968 B2
(45) Date of Patent: Jan. 9, 2024

(54) SYSTEMS AND METHODS FOR AN IMPROVED CAMERA SYSTEM USING FILTERS AND MACHINE LEARNING TO ESTIMATE DEPTH

(71) Applicant: Toyota Motor Engineering & Manufacturing North America, Inc., Plano, TX (US)

(72) Inventor: Sean P. Rodrigues, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 17/229,290

(22) Filed: Apr. 13, 2021

(65) Prior Publication Data

US 2022/0329773 A1 Oct. 13, 2022

(51) Int. Cl.
*H04N 13/218* (2018.01)
*G06V 20/58* (2022.01)
*H04N 13/00* (2018.01)

(52) U.S. Cl.
CPC .......... *H04N 13/218* (2018.05); *G06V 20/58* (2022.01); *H04N 2013/0081* (2013.01)

(58) Field of Classification Search
None
See application file for complete search history.

(56) References Cited

U.S. PATENT DOCUMENTS

| | | | |
|---|---|---|---|
| 8,830,556 B2 | 9/2014 | Smith et al. | |
| 9,448,460 B2 | 9/2016 | Shen et al. | |
| 10,634,557 B2 | 4/2020 | Khorasaninejad et al. | |
| 2014/0327816 A1* | 11/2014 | Tovey | G01J 3/28 250/353 |
| 2017/0082263 A1 | 3/2017 | Byrnes et al. | |
| 2019/0006743 A1 | 1/2019 | Kirino et al. | |
| 2020/0160598 A1 | 5/2020 | Manivasagam et al. | |
| 2020/0210726 A1 | 7/2020 | Yang et al. | |

(Continued)

FOREIGN PATENT DOCUMENTS

| | | |
|---|---|---|
| WO | 2019048200 A1 | 3/2019 |
| WO | 2019075335 A1 | 4/2019 |
| WO | 2020002164 A1 | 1/2020 |

OTHER PUBLICATIONS

Wang et al., "Pseudo-lidar from visual depth estimation: Bridging the gap in 3D object detection for autonomous driving," Proceedings of the IEEE Computer Society Conference on Computer Vision and Pattern Recognition, pp. 3445-8453, (2019).

(Continued)

*Primary Examiner* — Samuel D Fereja
(74) *Attorney, Agent, or Firm* — Christopher G. Darrow; Darrow Mustafa PC

(57) ABSTRACT

System, methods, and other embodiments described herein relate to estimating depth using a machine learning (ML) model. In one embodiment, a method includes acquiring image data according to criteria from a detector that uses a lens to resolve multiple angles of light per section of the detector. The method also includes mapping a kernel to the image data according to a view associated with the section and a size of the kernel. The method also includes processing the image data using the ML model to produce the depth according to the size of the kernel.

20 Claims, 11 Drawing Sheets

(56) References Cited

U.S. PATENT DOCUMENTS

| | | | |
|---|---|---|---|
| 2020/0225386 A1* | 7/2020 | Tsai | G02B 3/0068 |
| 2021/0256659 A1* | 8/2021 | Cho | G06T 5/30 |
| 2022/0138977 A1* | 5/2022 | Yan | G06N 3/08 |
| | | | 382/154 |

OTHER PUBLICATIONS

You et al., "Pseudo-LiDAR++: Accurate Depth for 3D Object Detection in Autonomous Driving," ICLR, pp. 1-22, arXiv: 1906.06310v3 [cs.CV] Feb. 15, 2020.

Kyle Field, "Tesla Achieved The Accuracy Of Lidar With Its Advanced Computer Vision Tech," CleanTechnica, pp. 1-4, Aug. 3, 2020.

Kang et al., "Electrifying photonic metamaterials for tunable non-linear optics," Nature Communications, Article No. 4680, pp. 1-7, Aug. 2014.

Liang et al., "Free-standing plasmonic metal-dielectric-metal bandpass filter with high transmission efficiency," Scientific Reports, article No. 4357, pp. 1-8, Jun. 28, 2017.

Sinha et al., "DELTAS: Depth Estimation by Learning Triangulation and Densification of Sparse Points for Multi-view Stereo," ECCV 2020, pp. 1-22.

Ding et al., "Learning Depth-Guided Convolutions for Monocular 3D Object Detection," IEEE/CVF Conference on Computer Vision and Pattern Recognition (CVPR) Workshops, pp. 1-12, 2020.

Nakamura et al., "Real-time monocular ranging by Bayesian triangulation," 2013 IEEE Intelligent Vehicles Symposium (IV) pp. 1368-1373, Jun. 2013, Gold Coast, Australia.

Weng et al., "Monocular 3D Object Detection with Pseudo-LiDAR Point Cloud," Proceedings of the IEEE/CVF International Conference on Computer Vision, pp. 1-10, Mar. 2019.

Chen et al., "DSGN: Deep Stereo Geometry Network for 3D Object Detection," IEEE/CVF Conference on Computer Vision and Pattern Recognition (CVPR), 2020, pp. 12536-12545.

Wang et al., "Flow-Motion and Depth Network for Monocular Stereo and Beyond," IEEE Robotics and Automation Letters, vol. 5, No. 2, pp. 3307-3314, Apr. 2020.

Qin et al., "Triangulation Learning Network From Monocular to Stereo 3D Object Detection," 2019 IEEE/CVF Conference on Computer Vision and Pattern Recognition, Long Beach, CA, USA, 2019, pp. 7607-7615.

Munguia et al., "A Robust Approach for a Filter-Based Monocular Simultaneous Localization and Mapping (SLAM) System," Sensors 2013, 13, pp. 8501-8522.

Kogos et al., "Plasmonic ommatidia for lensless compound-eye vision," Nat Commun 11, 1637, pp. 1-9, 2020.

Lan et al., "Metasurfaces for Near-Eye Augmented Reality," ACS Photonics 2019, vol. 6, issue 4, pp. 1-23.

Khorasaninejad et al., "Metalenses at visible wavelengths: Diffraction-limited focusing and subwavelength resolution imaging," Science, vol. 352, issue 6290, pp. 1190-1194, Jun. 2016.

Arbabi et al., "Miniature optical planar camera based on a wide-angle metasurface doublet corrected for monochromatic aberrations," Nat Commun 7, 13682, pp. 109, 2016.

Kamali et al., "A review of dielectric optical metasurfaces for wavefront control," Nanophotonics 2018; vol. 7, issue 6, pp. 1041-1068.

Zou et al., "Imaging based on metalenses," Photonix vol. 1, issue 2, pp. 1-24, 2020.

Khorasaninejad et al., "Super-Dispersive Off-Axis Meta-Lenses for Compact High Resolution Spectroscopy," Nano Lett. 2016, vol. 16, pp. 3732-3737.

Adams et al., "Perfect compensation of absorption in metamaterials for diffraction-unlimited imaging," 7th International Conference on Metamaterials, Photonic Crystals and Plasmonics 2016, Non-Hermitian engineering in photonics, plasmonics and metamaterial, 2 pages, Jul. 2016, Malaga, Spain.

Bayati et al., "Inverse designed metalenses with extended depth of focus," ACS Photonics 2020, vol. 7, issue 4, pp. 873-878.

Phare et al., "Silicon Optical Phased Array with High-Efficiency Beam Formation over 180 Degree Field of View," pp. 1-12, 2018.

Li et al., "Metalens-Based Miniaturized Optical Systems," Micromachines 2019, vol. 10, pp. 1-21.

Shalaginov et al., "A single-layer panoramic metalens with > 170° diffraction-limited field of view," pp. 1-14, 2019.

\* cited by examiner

SYSTEMS AND METHODS FOR AN IMPROVED CAMERA SYSTEM USING FILTERS AND MACHINE LEARNING TO ESTIMATE DEPTH

TECHNICAL FIELD

The subject matter described herein relates, in general, to a camera system, and, more particularly, to an improved camera system including directional optics and a machine learning model to estimate depth.

BACKGROUND

Vehicles may be equipped with sensors that facilitate perceiving other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired data to detect the presence of objects and other features of a scene. In further examples, additional/alternative sensors such as camera systems may be implemented to acquire information about the surrounding environment from which a system derives awareness about aspects of the surrounding environment. This sensor data can be useful in various circumstances for improving perceptions of the surrounding environment so that systems such as automated driving systems can perceive the noted aspects and accurately plan and navigate accordingly.

In general, the further awareness is developed by the vehicle about a surrounding environment, the better a driver can be supplemented with information to assist in driving and/or the better an autonomous system can control the vehicle to avoid hazards. A system using LIDAR for object detection is optimal for long ranges. Therefore, a vehicle may use a pseudo-lidar system to detect objects using an image(s) processed by a system using multiple cameras and multiple sensors for both short and long ranges. However, pseudo-lidar systems that rely on multiple cameras and sensors may cause computational complexity. Furthermore, a pseudo-lidar system may create a spatial point distribution or point cloud associated with an estimated depth similar to LIDAR systems using images that vary in time and space. A system processing image data for accurate spatial point distributions may at times be complex.

Moreover, a pseudo-lidar system may take images from multiple cameras for depth estimation. A pseudo-lidar system may resolve images from multiple cameras using a machine process to search for image overlap. For instance, an image overlap may be a stereo-pair having two or more images that share a corresponding image point. However, a pseudo-lidar system searching for image overlap is time-consuming and computationally intensive.

SUMMARY

In one embodiment, example systems and methods relate to a manner of improving pseudo-light detection and ranging (pseudo-lidar) using a camera system including directional optics and a machine learning (ML) model to estimate depth. In various implementations, pseudo-lidar systems are computationally intensive at accurately detecting objects in a scene when combining data from multiple sensors or cameras to produce a spatial point distribution. Furthermore, pseudo-lidar hardware using multiple sensors may increase the size of components, processing tasks, and delays to estimate depth. Accordingly, pseudo-lidar systems may encounter difficulties for efficiently and accurately estimating depth causing frustration. Therefore, in one embodiment, a camera system reduces computation to estimate depth of a scene using an ML model, hardware, and limited sensor inputs for resolving angles of a lightwave(s) associated with an image(s). The output(s) of the camera system may be image data at a wide field-of-view due to combining redundant information of the scene. A system may resolve angles of a lightwave(s) according to parameters of a lens optimized to estimate depth. In addition, the system may use the ML model to reduce computation by processing parts of image data generated by a lens and a detector. The system may use processed image data from the ML model to classify and estimate depth of objects in the scene near the camera system.

Moreover, the camera system may use an inverted or graded lens and independent filtering per pixel of a detector to resolve particular angles of lightwave(s) for subsequently estimating depth. The camera system may redirect a lightwave(s) associated with a reduced resolution image per pixel of the detector array to improve objection detection. The output(s) of the camera system may be improved image data including objects that simplify subsequent ML or tasks to estimate depth.

In addition, the camera system may use an inverted or graded lens to filter light associated with objects by dividing the detector into sections to resolve particular angles of lightwaves for subsequently estimating depth. A section may be associated with a pixel or a plurality of pixels. For example, the camera system may use per quadrant filtering with a detector divided by quadrants that represent a different focus area to resolve an angle(s) of lightwaves associated with an image.

A vehicle may be equipped with a camera system using per pixel or quadrant filtering according to efficiency or quality requirements. Furthermore, the camera system may filter light by wavelength for a color image(s) prior to further filtering. In one approach, the camera system may use resonant waveguide gratings (RWG) on the light to resolve various angles. The camera system may use the RWG as a bandpass filter to transmit resolved angles of light at the wavelength to a pixel or a quadrant of the detector. The RWG may improve image detection by outputting image data of the color image(s) including objects that simplifies subsequent ML or tasks to estimate depth.

In one embodiment, a camera system to estimate depth using a ML model is disclosed. The camera system includes a memory communicably coupled to a processor. The memory stores an acquisition module including instructions that when executed by the processor cause the processor to acquire image data according to criteria from a detector that uses a lens to resolve multiple angles of light per section of the detector. The memory also stores a determination module including instructions that when executed by the processor cause the processor to map a kernel to the image data according to a view associated with the section and a size of the kernel and process the image data using the ML model to produce the depth according to the size of the kernel.

In another embodiment, a non-transitory computer-readable medium to estimate depth using a ML model and including instructions that when executed by a processor cause the processor to perform one or more functions is disclosed. The instructions include instructions to acquire image data according to criteria from a detector that uses a lens to resolve multiple angles of light per section of the detector. The instructions also include instructions to map a kernel to the image data according to a view associated with the section and a size of the kernel. The instructions also include instructions to process the image data using the ML model to produce the depth according to the size of the kernel.

In another embodiment, a method to estimate depth using a ML model is disclosed. In one embodiment, the method includes acquiring image data according to criteria from a detector that uses a lens to resolve multiple angles of light per section of the detector. The method also includes mapping a kernel to the image data according to a view associated with the section and a size of the kernel. The method also includes processing the image data using the ML model to produce the depth according to the size of the kernel.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1A:
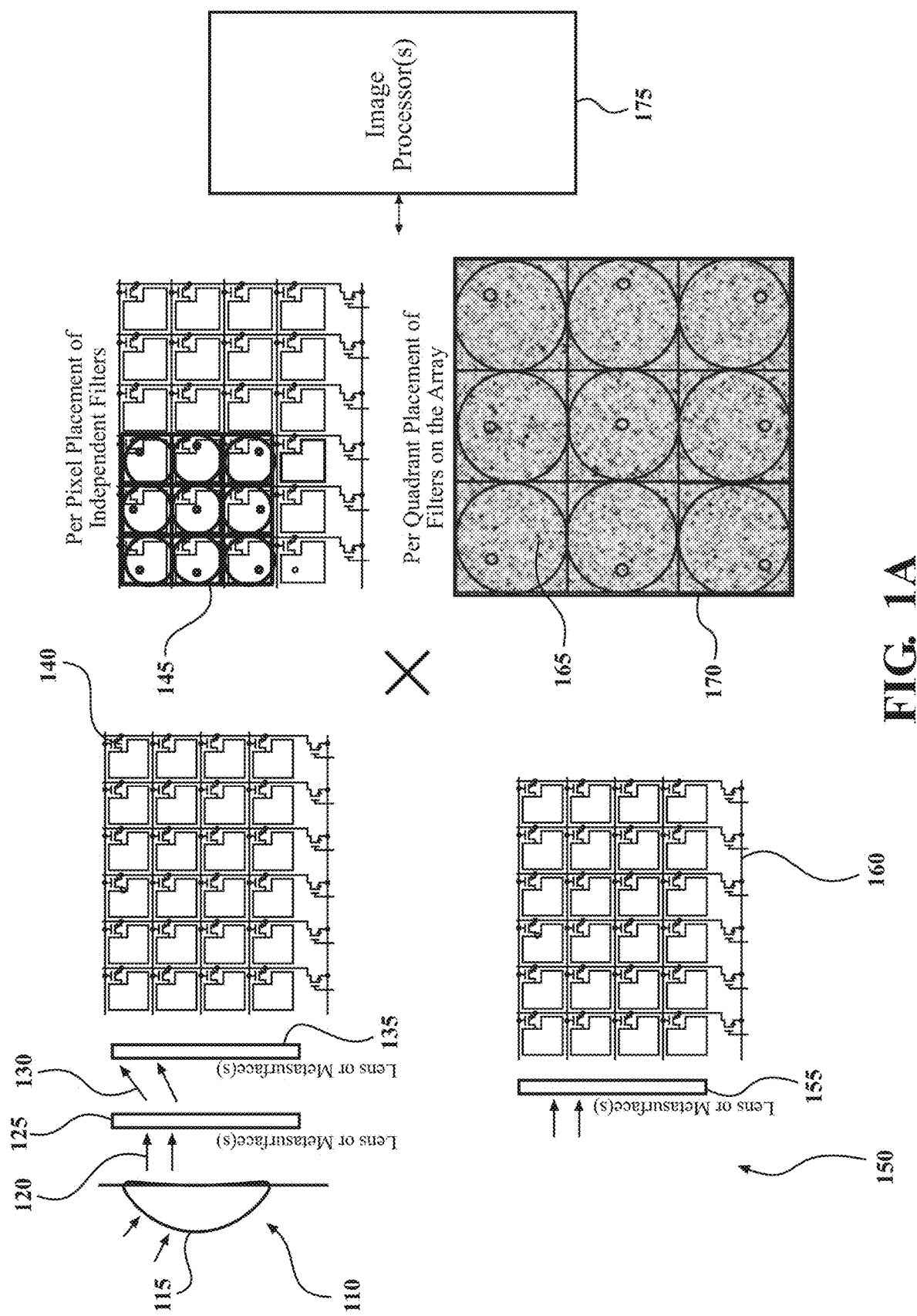
FIGS. 1A-1C illustrate various embodiments of camera systems using filters to estimate depth associated with an object in a scene and an output(s) of the camera systems.

Systems, methods, and other embodiments associated with improving a camera system using directional optics, physical filters, and a machine learning (ML) model to estimate depth are disclosed herein. The camera system detects an object and reduces costs by optically resolving the angle of a lightwave(s) from multiple views captured, in grayscale or color, using an inverted or graded lens and a metasurface. A system may resolve angles of a lightwave(s) according to parameters of properties associated with a lens or metasurface optimized to estimate depth by adapting to planarization effects. The system may also optically remove unwanted parallelism according to the parameters, thereby improving light capture before further processing. Furthermore, the system may use the ML model, such as deep learning, to process image data represented in a two-dimensional (2D) matrix that is less than the full image for reduced processing and increased speed.

The ML model may process the 2D matrix according to per section (e.g. pixel or area, etc.) capture. The system may map a kernel using an optimal size to the image data at a view or angle of a given scene. In one approach, the system may process the image data from the ML model to classify, segment, or estimate depth of objects in the scene near the camera system. For example, the system may use the ML model results to subsequently triangulate an object in a scene associated with the image data to generate a point cloud using estimated depth. The point cloud may be similar to representations generated by light detection and ranging (LIDAR) systems to estimate depth using simpler hardware and an ML model that reduces processing and improves accuracy.

For color-based capture, the camera system may process by color wavelength, invert, and filter captured light for detection per section. In one approach, the camera system using per pixel filtering may have independent filters on a pixel to resolve the angles of a lightwave(s). Image detection may be improved by filtering and combining views on an individual pixel basis rather than whole images. Furthermore, processing by color may be performed by resonant waveguide gratings (RWGs) that transmit a lightwave(s) to the detector if the lightwave(s) matches the wavelength and the angle of a color filter and a metasurface, respectively, for accurate color alignment.

Similar to per pixel filtering, a camera system may process an image to detect an object using a detector divided into areas to resolve particular angles of lightwaves for subsequent estimation of depth associated with an object. For example, a camera system uses a quadrant filter of X by X dimensions in size according to the number of quadrants arranged for a detector. In one approach, a camera system may use different size apertures for a quadrant allowing capture of various levels of light per quadrant rather than individual pixels. In this way, the camera system may reduce processing tasks by capturing an image according to a group of pixels rather than individual pixels.

Furthermore, a camera system may filter using metamaterials, such as metalenses or metasurfaces, manufactured using any one of electron-beam lithography, roll-to-roll printing, photolithography, and so on. Metasurfaces provide a substantially flat profile for denser use in an array of lenses thereby improving image processing. The transmission profile of metasurfaces may include a desired region of light for transmission to a pixel or area in an angle range. In this way, a camera system detects an image from multiple views with an improved accuracy and reduced complexity using metasurfaces and per section filtering for estimating depth.

Figure 1B:
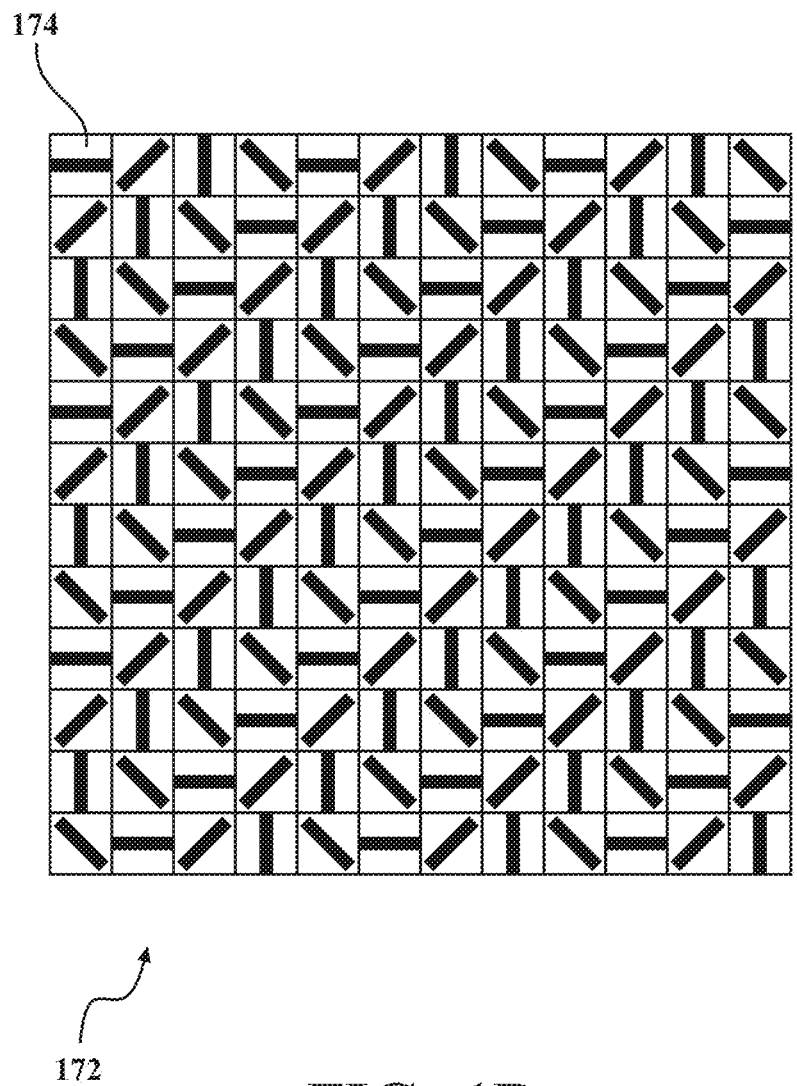
Figure 1C:
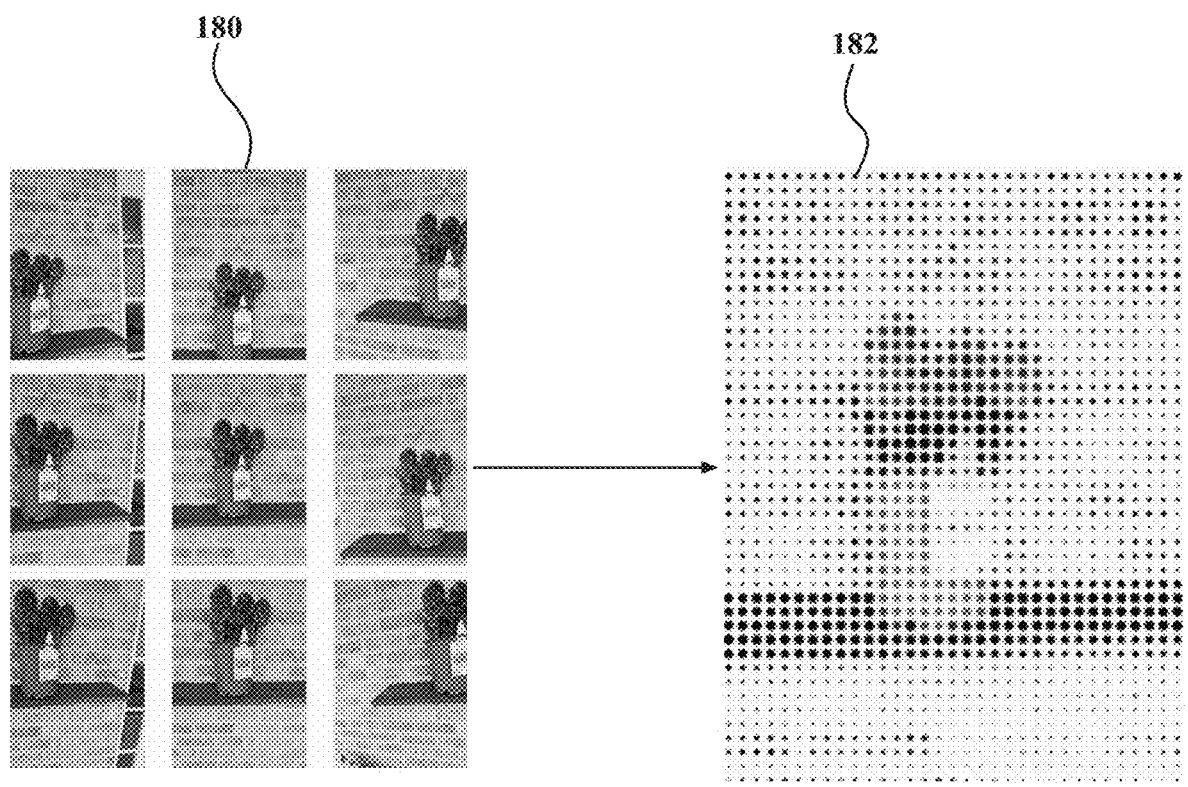

FIGS. 1A-1C illustrate various embodiments of camera systems using filters to estimate depth associated with an object in a scene and an output(s) of the camera systems. The camera system 110 or 150 may be incorporated in a vehicle for detecting hazardous objects or obstacles in the field-of-view. However, in various implementations given herein, the camera system 110 or 150 may be used in any one of a vehicle, a security system, a traffic system, a municipal monitoring system, a mobile device, simultaneous localization and mapping robotics, camera tracking, a structure from motion, projective geometry, multi-view stereo for volumetric methods, and so on for multi-perspective imaging using a single camera system. In FIG. 1A, a camera system 110 may use the lens 115 to receive and direct the inverted light 120 associated with a scene to the metasurface(s) 125. The metasurface(s) 125 may be a lens or a lens system. In one approach, a lens system can include two or more optical elements in conjunction with one or more apertures or focal points. An aperture may include irises or pupils. In this way, the camera system 110 using multiple lenses may process different forms of light.

The metasurface(s) 125 may invert and undo parallel effects, such as by filtering, of the k-vector of the inverted light 120 for further filtering. In one approach, a metasurface lens may be configured in the camera system 110 for close placement to the detector array 140, thereby reducing system size and distortion. The detector array 140 may be composed of a plurality or group of pixels. In one approach, the metasurface(s) 125 may be composed of a photonic bandgap crystal. However, a system may use any lens composition to invert the inverted light 120 to proper form for further processing. Furthermore, the lens 115, the metasurface(s) 125, the metasurface(s) 135, and the detector array 140 may be operatively connected. The term "operatively connected," as used throughout this description, can include direct or indirect connections, including connections without direct physical contact.

Moreover, the metasurface(s) 135 may receive the transmitted light 130 from the metasurface(s) 125. In one approach, the metasurface(s) 135 may provide per pixel or area filtering to resolve an angle of the transmitted light 130 to detect an image(s). A vehicle may be equipped with a camera system using per pixel or quadrant filtering according to efficiency or quality requirements. Although a quadrant may be used in the examples herein, a camera system may use any area size to resolve angles of a lightwave(s) by filtering. Furthermore, a camera system may resolve angles of a lightwave(s) since a lightwave(s) takes the form of a plane wave for capture by the detector array 140. The metasurface(s) 135 may undo planarization of the plane wavefront and thereby improve image detection to estimate depth. A proximal distance of the metasurface(s) 135 and another filter(s) to resolve an angle may result in minimal distortion of the image(s) due to the substantially flat profile of metasurfaces. The lightwave(s) that passes through a filter provides an image for improved detection or capture. For example, the metasurface(s) 135 may transmit a lightwave(s) or a photon(s) at 15-30 degrees from the z-axis to a single-pixel according to the per pixel filter 145 placement resolving an angle of the transmitted light 130. However, in the examples given herein the camera system may also transmit the lightwave(s) or photons at 1-45 degrees from normal. The camera system 110 uses the placement of independent filters on a pixel to resolve the angles of a lightwave(s) individually. In this way, a camera system resolves angles of a lightwave(s) at a pixel level to improve quality.

The size of an independent filter may match the size of a pixel of the detector array 140. The camera system 110 improves image capture for estimating depth using per pixel filtering by resolving an angle(s) of light from multiple perspectives individually rather than by area of a detector. In this way, a single-pixel of the detector array 140 has a resolved angle of the lightwave(s) to output to the image processor(s) 175 generating an image from multiple views.

Similar to the aforementioned operation of the metasurface(s) 135, the camera system 150 may use the metasurface(s) 155 that is graded to provide per pixel or quadrant filtering to resolve an angle of captured lightwaves to detect an image(s). In one approach, a graded lens may use the metasurface(s) 135 and function as an imaging lens to capture and resolve an image 15 degrees off-axis to the normal plane of the detector. For per pixel capture, a lens of the metasurface(s) 135 grade may be broken up and subdivided across the entire surface of the detector array 160. However, the camera system 150 may use per quadrant filtering by dividing the detector array 160 into areas that represent a group of pixels. For example, nine areas can be used that correlate to 9 different focus areas of an image.

Resolving angles of a lightwave(s) may be needed since a lightwave(s) takes the form of a plane wave for capture by the detector array 160. The metasurface(s) 155 may undo "planarization" of the plane wavefront and thereby improve image detection to estimate depth. A proximal distance of the metasurface(s) 155 and another filter(s) to resolve an angle may result in minimal distortion of the image(s) due to the substantially flat profile of metasurfaces. The lightwave(s) that passes through a filter provides an image for improved detection or capture.

In addition, the metasurfaces 135 or 155 may filter the light using per area filtering of two or more pixels. An area of two or more pixels may represent a different focus area, view, or offset of the image. In one approach, a camera system may use a quadrant filter of X by X dimensions, where X is the pixel size for a single filter. The filter 170 on the detector or pixel area 165 may include a number of quadrants, divisions, zones, and so on. In one approach, different size apertures may be used for a quadrant allowing capture of various levels of light rather than individual pixels. The camera system may capture multiple views of a scene on a single detector or pixel array by detecting a lightwave(a) directed, emitted, or scattered from a specific direction to a specific area to detect an image rather than by pixel. However, a system may produce a different quality estimation of depth using per pixel processing.

FIG. 1B illustrates that a metasurface(s) 172 functioning as a lens for a given wavelength of light by manipulating phase. A unit cell 174 of the metasurface(s) 172 is tuned for per pixel or quadrant filtering to resolve angles of light. The unit cell 174 may contain one or more nanostructures elements, shown as rectangles, to direct a lightwave(s) and control the optical phase for a lightwave(s). For example, a unit cell may be tuned to operate according to a corresponding grayscale filter or red, green, and blue (RGB) filter such that the metasurface's size or shape will add or subtract the appropriate phase needed to operate at the given wavelength for filtering. Moreover, unlike an inverted lens, a metasurface is substantially flat. For example, a metasurface can be less than a micron tall. The size of metasurface materials allows denser use on a detector.

FIG. 1C illustrates a system capturing nine images 180 from multiple views of a scene including an object that are offset. Although nine images are illustrated, the system may capture any number of images according to the views present for a scene to estimate depth. As explained further below, a camera system using directional optics, physical filters, and an ML model will process the images 180 to produce a spatial point distribution or point cloud representation 182 with an improved estimation of depth from the improved combined views of the images 180. In one approach, the object in the spatial point distribution or point cloud representation 182 may have a resolution reduced by nine using images from multiple views for a more optimal depth due to an increased range of data. Furthermore, the spatial point distribution or point cloud representation 182 may be similar to representations generated by LIDAR systems to estimate depth generated with less complexity using the camera system 110 or 150.

Figure 2:
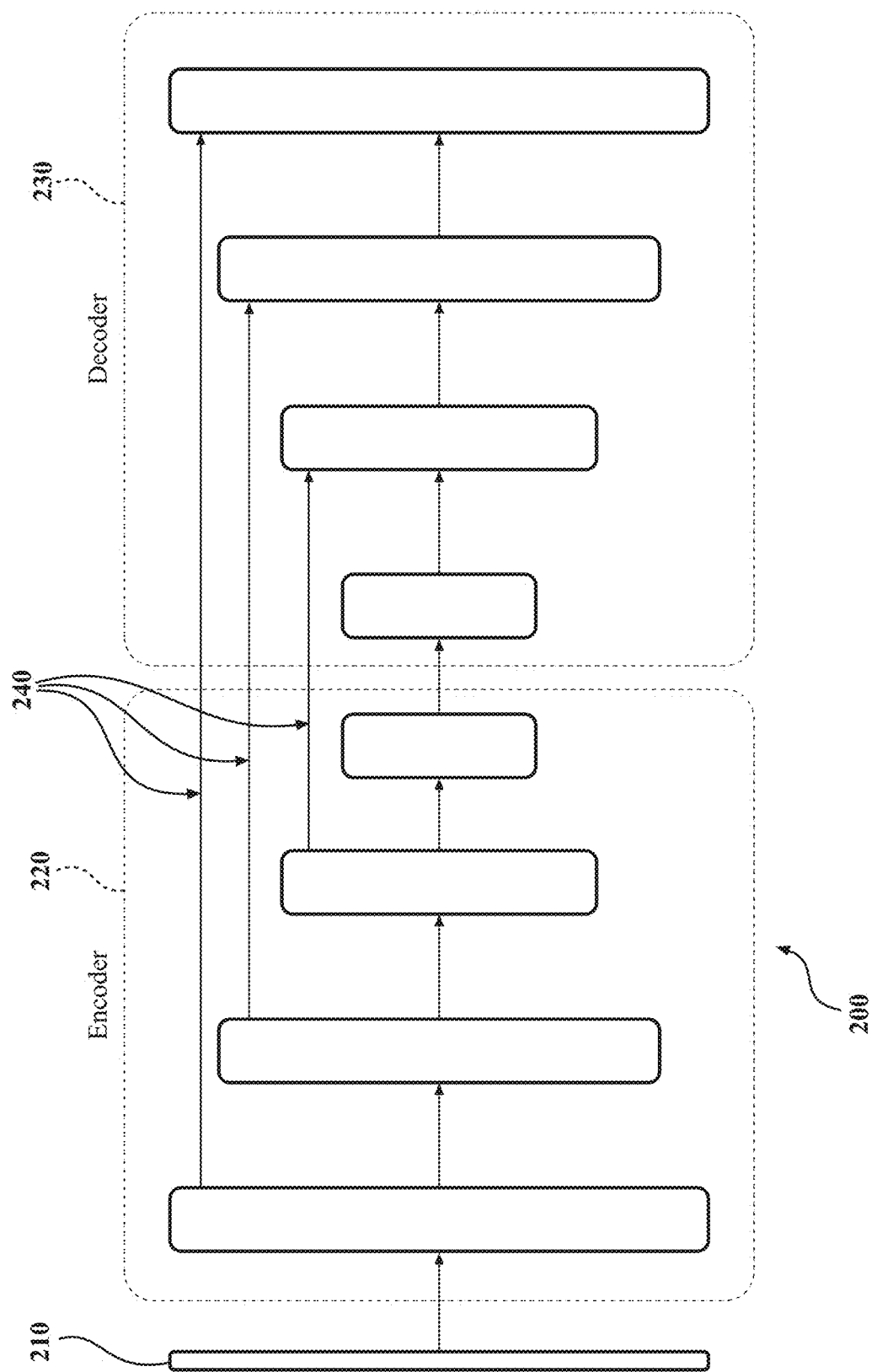
FIG. 2 illustrates a machine learning (ML) model to estimate depth associated with an object in a scene.

FIG. 2 illustrates a ML model 200 to estimate depth associated with an object in a scene. The image data may be a 2D representation of images captured by the camera systems 110 or 150 of multiple views of a scene. For per pixel capture, the 2D matrix may be (row of pixels)×(column of pixels) that represents total intensity, RGB when applicable, and angle information of a plurality of multiple captured images by pixels. The 2D matrix may exclude a z-component information to reduce processing. For per area processing, a 2D matrix may represent portions of multiple captured images (e.g. nine images). In one approach, the image data 210 may also be formatted to represent a number of images, image height, image width, image depth, and so on for improved spatial point distribution or point cloud generation.

The image data 210 is processed by encoders 220 for deep learning such as by a convolutional neural network (CNN). Convolution is a particular linear operation used in neural networks in place of general matrix multiplication to reduce processing. Accordingly, at least one layer of encoders 220 may use a CNN to reduce the number of free parameters, allowing the network to be deeper with fewer parameters and more simplicity. Instead of receiving input from every element of the previous layer, a convolutional layer receives input from a restricted subarea of the previous layer or receptive field. In a convolutional layer, the receptive area is smaller than the entire previous layer.

For a CNN processing image data, the subarea of the original input data in the receptive field grows deeper in the network architecture from re-applying a convolution operation which takes into account the value of a specific pixel and surrounding pixels. In one approach, the image data 210 becomes abstracted to a feature map, with (number of images)×(feature map height)×(feature map width)×(feature map channels) after passing through a convolutional layer. Furthermore, a convolutional layer within a neural network may be associated with a number of input channels and output channels or hyper-parameters. The depth of the convolution filter or input channels is equal to the number channels of the input feature map.

Moreover, a camera system using sections more than a single pixel may output image data in color using three matrices with similar contrast features for RGB. The color images are represented by the three matrices with values ranging from 1 to 255. The matrix may be composed by the (row of pixels)×(column of pixels)×(color) or m×n×z. A camera system may also filter using a plurality of different radial angles instead of colors represented by (row of pixels)×(column of pixels)×(orientation) for processing by the ML model 200 to improve the estimation of depth.

In one approach, the encoders 220 include convolutional layers, pooling layers, rectified linear units (ReLU), and/or other functional blocks that separately process the image data 210 according to a learned prior. Once generated in the encoder 220, low-resolution representations of feature maps are fed into the decoder 230. In one embodiment, the decoder 230 is an extension of the neural network that comprises the encoder 220. In other embodiments, the decoder 230 may be a generative neural network that accepts the low-resolution representations of the image data 210 from multiple views of a scene to estimate depth. Furthermore, the ML model 200 may use skip connections 240 between activation blocks of the encoder 220 and the decoder 230 that facilitate resolving higher resolution details.

A system may use the ML model 200 to estimate depth using a manageable size for a kernel associated with a CNN. In one approach, the size of the kernel may be proportional to the number of views in per pixel filtering. The kernel may be a linear kernel, a Gaussian kernel, a polynomial kernel, and so on. An ML model may process data according to a kernel method. A kernel may be a user-defined similarity function over pairs of data points in a raw representation. Furthermore, a kernel method may operate in a high-dimensional, implicit feature space without computing the coordinates of the data in that space. In this way, an ML model using a kernel method may distinguish features of the image data with less computational cost.

In one approach, the system may execute a CNN on the image by taking a gradient across the image of a scene from multiple views. For example, a 9×9 convolution matrix may be used to have a manageable size of the convolutional kernel. In this way, a system may use the CNN to efficiently determine the distance to an object without processing whole images. The system may also aggregate data from corners of a 2D image matrix to reduce offset thereby improving the estimation of depth tasks. For instance, a system performing per pixel processing may compute the gradient across a row of pixels x to detect changes in intensity I. Consequently, the derivative dI/dx may be used as an indicator of an object. Moreover, a system may differentiate within kernels, via binning, and across kernels to provide distinct outputs compared to outputs without the pixel, multi-view perspective. Information across the scene, via multiple views, may be gathered by a system in a local region using known parameters such as angles and depth. Thus, a camera system may use a CNN to estimate depth using multiple views of a scene with less complexity and computational cost.

Figure 3:
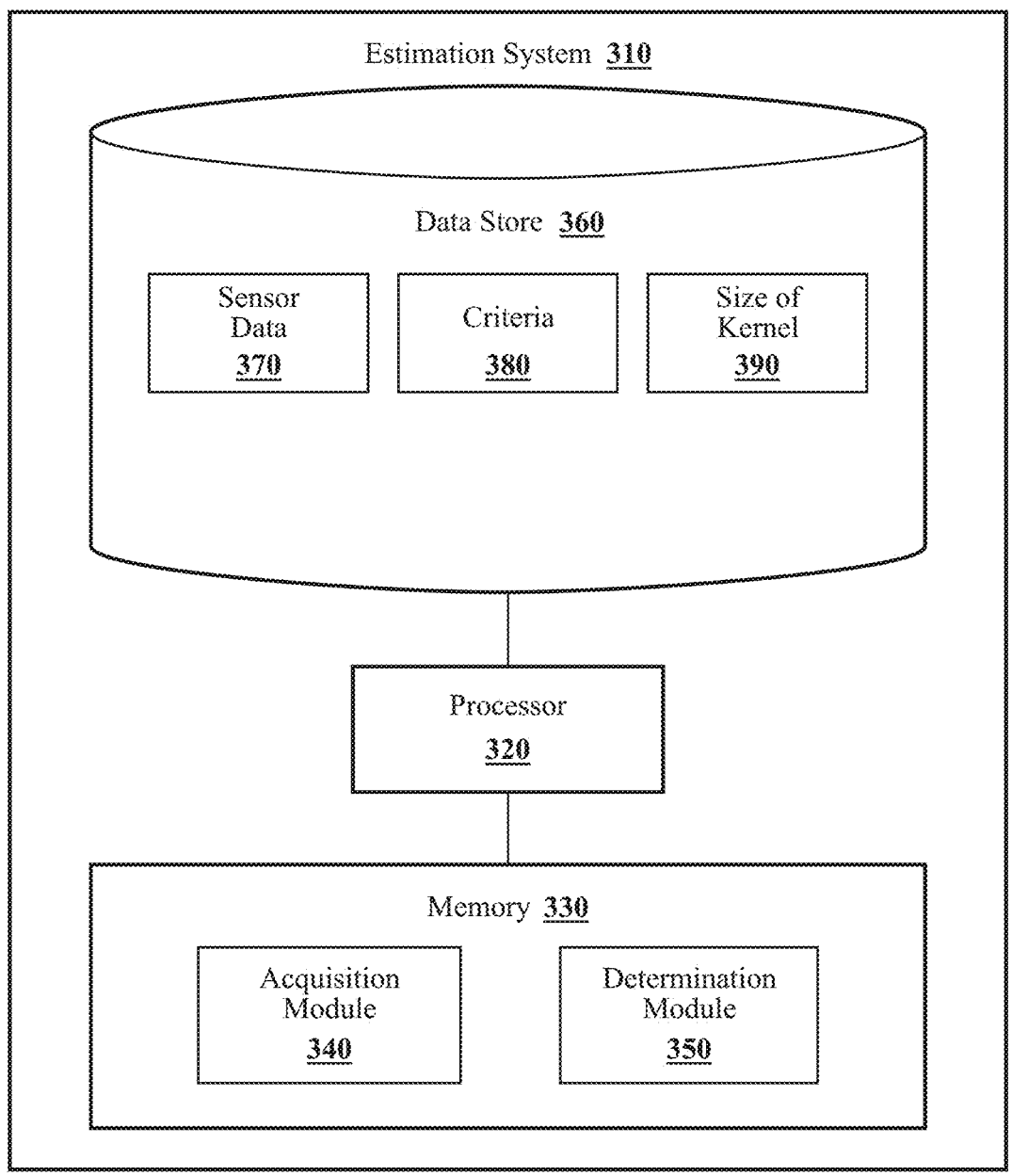
FIG. 3 illustrates one embodiment of an estimation system that is associated with the improved estimation of depth associated with an object in a scene.

Turning now to FIG. 3, an estimation system 310 is illustrated associated with the improved estimation of depth for an object in a scene. The estimation system 310 is shown as including a processor(s) 320 from the vehicle 800 of FIG. 8. Accordingly, the processor(s) 320 may be a part of the estimation system 310, the estimation system 310 may include a separate processor from the processor(s) 320 of the vehicle 800, or the estimation system 310 may access the processor(s) 320 through a data bus or another communication path. In one embodiment, the estimation system 310 includes a memory 330 that stores an acquisition module 340 and a determination module 350. The memory 330 is a random-access memory (RAM), read-only memory (ROM), a hard-disk drive, a flash memory, or other suitable memory for storing the modules 340 and 350. The modules 340 and 350 are, for example, computer-readable instructions that when executed by the processor(s) 320 cause the processor(s) 320 to perform the various functions disclosed herein.

Moreover, the acquisition module 340 generally includes instructions that function to control the processor(s) 320 to receive data inputs from one or more sensors of the vehicle 800. The inputs are, in one embodiment, observations of one or more objects in an environment proximate to the vehicle 800 and/or other aspects about the surroundings. As provided for herein, the acquisition module 340, in one embodiment, acquires sensor data 370 that includes at least camera images.

Accordingly, the acquisition module 340, in one embodiment, controls the respective sensors to provide the data inputs in the form of the sensor data 370. Additionally, while the acquisition module 340 is discussed as controlling the various sensors to provide the sensor data 370, in one or more embodiments, the acquisition module 340 can employ other techniques to acquire the sensor data 370 that are either active or passive. For example, the acquisition module 340 may passively sniff the sensor data 370 from a stream of electronic information provided by the various sensors to further components within the vehicle 800. Moreover, the acquisition module 340 can undertake various approaches to fuse data from multiple sensors when providing the sensor data 370 and/or from sensor data acquired over a wireless communication link.

In one embodiment, the estimation system 310 includes a data store 360. In one embodiment, the data store 360 is a database. The database is, in one embodiment, an electronic data structure stored in the memory 330 or another data store and that is configured with routines that can be executed by the processor(s) 320 for analyzing stored data, providing stored data, organizing stored data, and so on. Thus, in one embodiment, the data store 360 stores data used by the modules 340 and 350 in executing various functions. In one embodiment, the data store 360 includes the sensor data 370 along with, for example, metadata that characterize various aspects of the sensor data 370. For example, the metadata can include location coordinates (e.g., longitude and latitude), relative map coordinates or tile identifiers, time/date stamps from when the separate sensor data 370 was generated, and so on.

In one embodiment, the data store 360 further includes any one of the criteria 380 and the size of a kernel 390. In one approach, the size of the kernel 390 may be related to the number of unit cells or associated with the number of quadrants. Although a quadrant may be used in the examples herein, a camera system may use any area size to resolve angles of a lightwave(s) by filtering. Furthermore, a system may use the criteria 380 to determine if image data meets predetermined parameters. Image data may represent pixels or areas of multiple images that a network of lens processes to resolve angles and combined for capture by a single detector. Moreover, the predetermined parameters may be associated with resolution, noise levels, angle offsets, phase, or the like. The system subsequently may use an ML model for further processing to estimate depth using the image data according to the size of the kernel 390 that represents a portion, e.g. 3×3, of the image data to process. For example, in a CNN the size of the kernel 390 may represent a portion of the image data to process at a layer of the ML model.

The acquisition module 340, in one embodiment, is further configured to execute additional tasks beyond controlling the respective sensors to acquire and provide the sensor data 370. For example, the acquisition module 340 includes instructions that cause the processor(s) 320 to acquire image data according to the criteria 380 from the camera system 110 or 150. The camera system 110 or 150 may use a metasurface(s) or lens to resolve multiple angles of light per section and output the image data for further processing.

In one embodiment, the determination module 350 includes instructions that cause the processor(s) 320 to map a kernel to the image data according to a view(s) or element(s) associated with the section and the size of the kernel 390. For per area filtering, before mapping a kernel, a pixel in one area may be processed with the corresponding pixel in another area to combine different images from a single camera into elements. The determination module 350 may also process the image data to estimate depth according to the size of the kernel 390 and to classify an object in a scene associated with the image data using an ML model. A classification may be a new observation or label of an object in a scene determined by the ML model from image data such as by feature comparisons. For example, a class may be a vehicle, person, traffic light, light post, plant, and so on.

Figure 4:
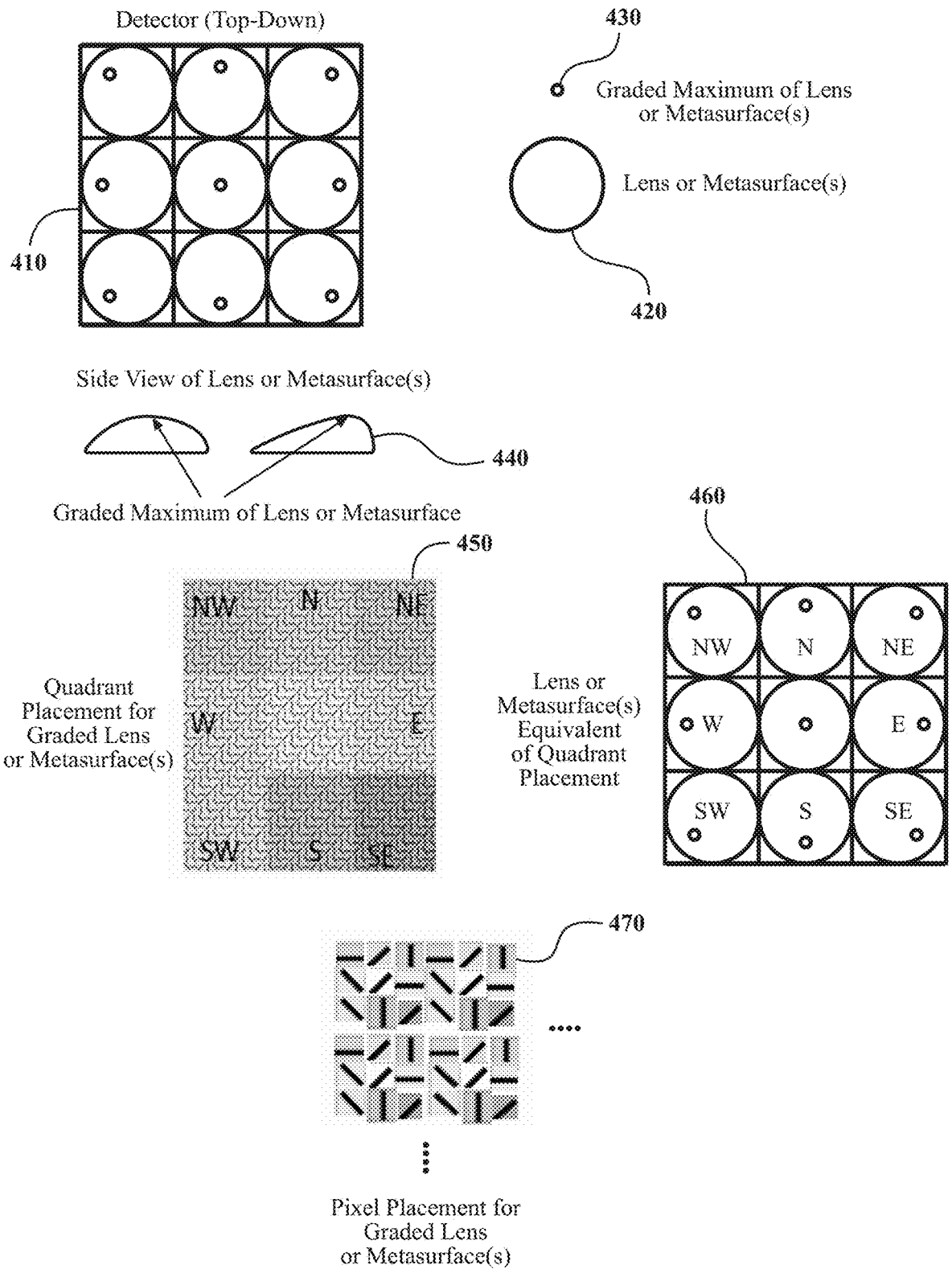
FIG. 4 illustrates one embodiment of filters used by a camera system to resolve angles of a lightwave(s).

FIG. 4 illustrates one embodiment of filters used by a camera system to resolve angles of a lightwave(s). For per pixel filtering, a detector may use a plurality of angle-based filters 410 for filtering. A metasurface(s) or lens 420 may comprise a graded maximum or peak 430 and a plurality of unit cell elements to resolve an angle of a lightwave(s) by refraction and phase alteration. A metasurface(s) may comprise a substantially flat profile for denser and proximate use on a detector for improved image processing. In one approach, metasurfaces may be manufactured using electron-beam lithography, roll-to-roll printing, photolithography, and so on. In one approach, the plurality of angle-based filters 410 may be a graded metasurface lens that a system uses to resolve angles associated with a grayscale image.

A side view of a metasurface(s) or lens 440 shows a graded maximum. Furthermore, for per quadrant filtering a plurality of angle-based filters 450 may be placed on-chip substantially proximate to a detector according to areas northwest (NW), north (N), northeast (NE), west (W), center, east (E), southwest (SW), south (S), and southeast (SE) to capture different parts of multiple images. For example, an area of angle-based filters 450 may correspond to a plurality or group of pixels for image capture associated with an angle to reduce complexity. Although a quadrant may be used in the examples herein, a camera system may use any area size to resolve angles of a lightwave(s) by filtering.

As further explained below, a system may filter using per quadrant placement for the graded metasurface and the lens equivalent of per quadrant filtering 460. In quadrant filtering, an area of the filter may be associated with a plurality of filters to reduce complexity when resolving angles. On the contrary, for per pixel placement 470 a graded metasurface lens may be divided by pixel elements and placed on a detector. In per pixel placement 470, a unit cell is tuned per pixel to resolve angles of light. The unit cell may contain one or more nanostructures elements, shown as rectangles, to modify the optical phase for a lightwave(s). In certain configurations, a camera system using per pixel placement may generate more rich image data to improve the estimation of depth.

Figure 5A:
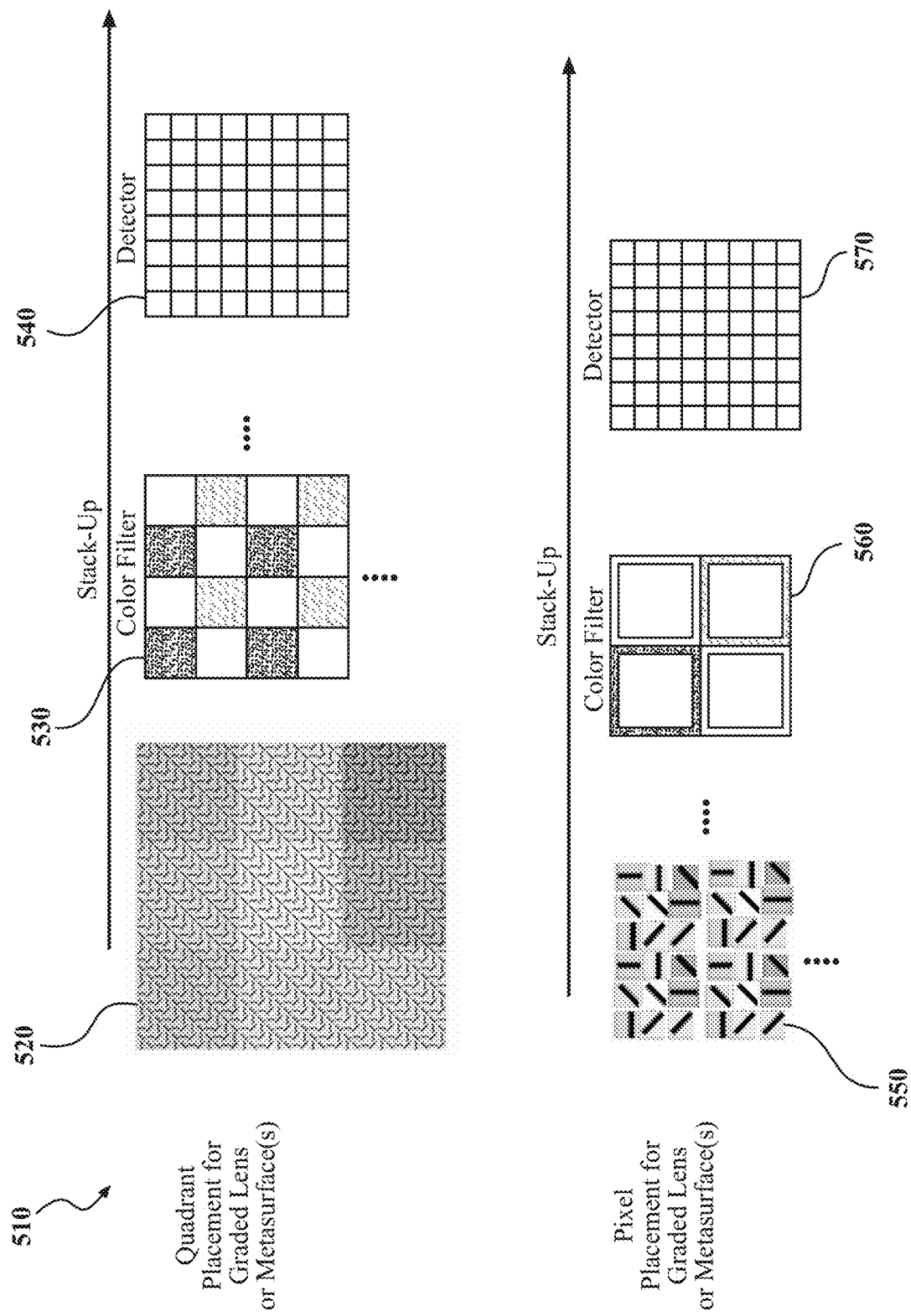
FIGS. 5A and 5B illustrate embodiments of camera systems filtering per section to estimate depth associated with an object in a scene.
Figure 5B:
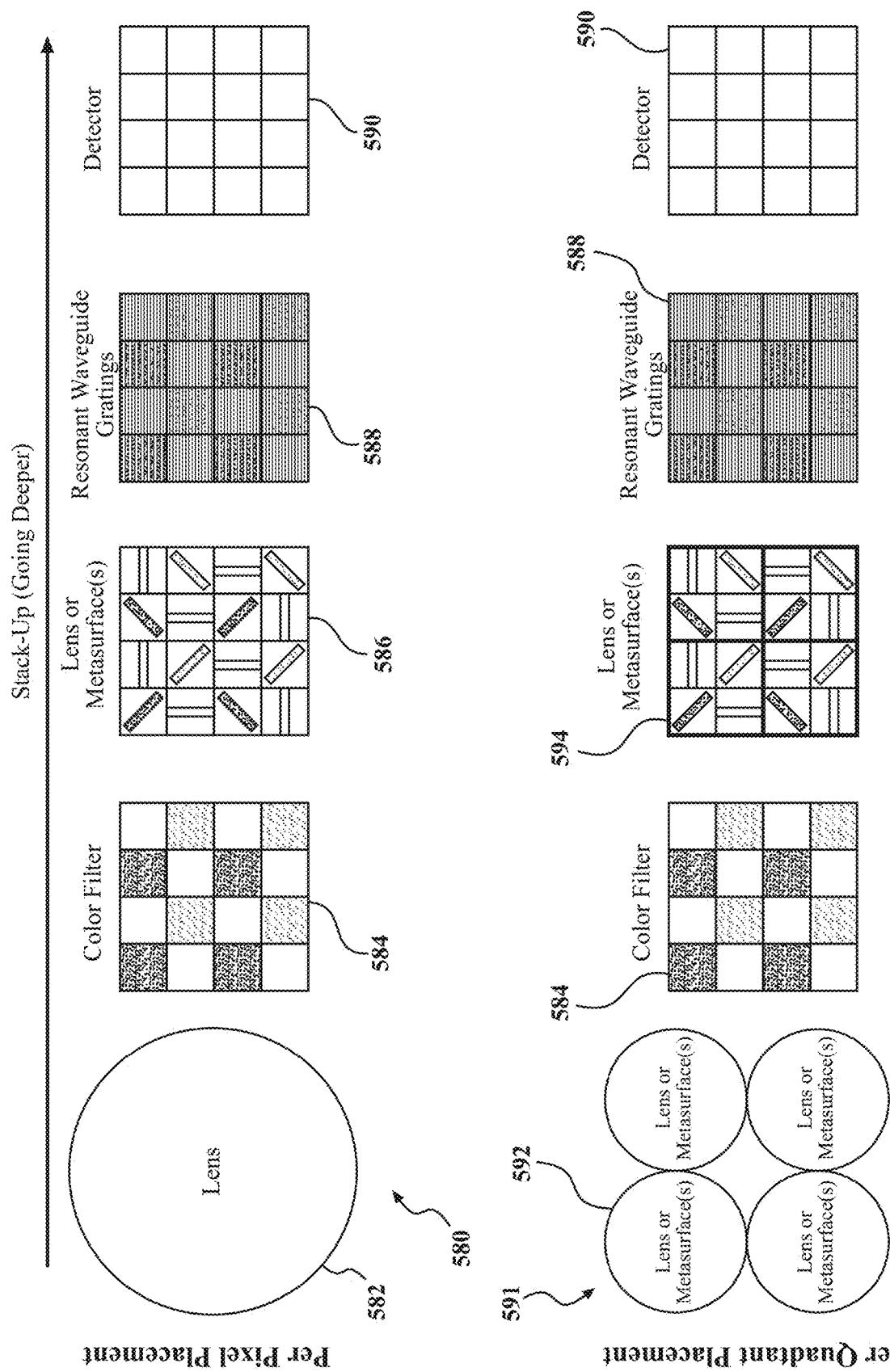

FIGS. 5A and 5B illustrate embodiments of camera systems 510 filtering per section to estimate depth associated with an object in a scene. For example, in a stack a per quadrant filter 520 may comprise a graded metasurface(s) or lens that transmits angle-resolved light for processing a lightwave(s) by color filter 530. In one approach, the color filter 530 may be divided similar to a standard lens to process a lightwave(s). The detector 540 may detect a lightwave(s) angle-resolved according to wavelength color.

In the examples given herein, a color filter may comprise a red filter substantially at 630 nanometers (nm), a green filter at 530 nm, and a blue filter at 400 nm wavelengths. However, a color filter may transmit filtered lightwaves at any wavelength on a color basis to a detector. In one approach, the filters may be Beyer filters that couple with other angle bandpass filters.

Similarly, in another stack a per pixel filter 550 may be used by a graded metasurface or lens that transmits angle-resolved light for processing a lightwave(s) by color filter 560. A camera system using per pixel placement may generate more rich image data to improve the estimation of depth. In one approach, the color filter 560 may be subdivided into nine lenses to utilize the same color filter thereby reducing the number of components. Lastly, the detector 570 may detect a lightwave(s) angle-resolved according to wavelength color.

In FIG. 5B, the camera systems 580 and 591 may be configured for per pixel and quadrant filtering, respectively, to resolve angles of a lightwave(s). For per pixel filtering, the camera system 580 may utilize an inverted or standard lens 582 that receives lightwaves associated with an object. The inverted or standard lens 582 may be a single lens or form a lens system. A lens system can include two or more optical elements in conjunction with one or more apertures. An aperture may include irises or pupils. A color filter 584 may filter the lightwaves from the inverted or standard lens 582 by wavelength. For instance, the camera system 580 may separate a lightwave(s) into RGB components for processing.

The metasurface(s) 586 may filter a lightwave(s) by removing an angle induced shift, inversion, and/or undo parallel effects at a pixel-level associated with the inverted or standard lens 582. A unit cell of metasurface(s) 586 may be tuned to operate within the parameters of the color filter 584 such that the metasurface's size or shape will add or subtract the appropriate phase needed to operate at the given wavelength of light tuned via the color filter 584. A unit cell of metasurface(s) 586 may contain one or more nanostructures to modify the optical phase. The metasurface(s) 586 may correspond to the size of the color filter 584 and provide a substantially flat profile for denser use on a detector and reduced image distortion. For example, the metasurface(s) 586 material may be a photonic band-gap crystal, silicon dioxide, or titanium dioxide. In contrast to other lens systems, the metasurface(s) 586 may be proximate or close to the detector 590 resulting in minimal distortion when filtering an image(s). In one approach, the detector 590 may be a complementary metal-oxide-semiconductor (CMOS), a charge-coupled device (CCD), and so on the detector or pixel array. The image processor(s) may further process the output of the detector 590 for subsequent depth estimation tasks. The improved image data may represent pixels or areas of multiple images that a network of lens processes to resolve angles and combined for capture by a single detector.

Furthermore, wavelength adaptive RWGs 588 may transmit the lightwave(s) to detector 590 if the lightwave(s) matches a wavelength and the angle of the color filter 584 and the metasurface(s) 586, respectively. The RWGs may operate within the tuned filter region of the color filter 584. A colored square in the color filter 584, the metasurface(s) 586, and the RWG 588 may correspond to a pixel of the detector 590. In this way, the camera system 580 resolves the color and angle combinations desired by combining angular bandpass filtering with color filtering using the components 584, 586, and 588.

A fabrication process may produce RWGs by depositing silicon on the surface of a transparent glass slab. RWGs produced by silicon may be desirable for image capture since silicon dioxide has a desirable refractive index of 1.45. In addition, silicon has a varied refractive index along the wavelength spectrum from 400 nm to 700 nm wavelengths for color image capture.

In one approach, a fabrication process may produce RWGs to resolve the angles of a lightwave(s) using titanium oxide fused to silica. For example, RWGs may stack two or more filters in conjunction with a red filter at 625 nm to allow transmission at an angle of incidence of 10 to 25 degrees. The RWG may also suppress waves at other angles for bandpass filtering prior to detection.

Moreover, RWGs may have minimized transmittance of normally incident light, high transmittance at angles of 15 degrees, or minimized transmittance up to 90 degrees-off normal. While the RWGs can restrict a lightwave(s) to transmit at these angles of incidence, the complete spectrum of a lightwave(s) transmitted can be accepted. Accordingly, the camera system 580 may resolve the color and angle combinations desired by combining angular bandpass filtering with color filtering.

Furthermore, for per quadrant filtering the camera system 591 may use a divided metasurface(s) or lens 592 that receives lightwaves at different angles or views associated with an object. Although the camera system 591 uses quadrants, the detector 590 may be divided into any grouping of pixels to resolve angles associated with the depth detection of an object in a scene of a captured image. The color filter 584 may filter the lightwave(s) by wavelength. For instance, the camera system 591 may separate the lightwaves into RGB components for processing. The metasurface(s) 594 may filter a lightwave(s) using a quadrant by removing an angle induced shift, inversion, and/or parallel effects associated with the inverted or standard metasurface(s) or lens 592. The metasurface(s) 594 may be a quadrant to filter of X by X dimensions, where X is the pixel size for a single filter and a quadrant corresponds to a lens size of divided metasurface(s) or lens 592. The metasurface(s) 594 may be a number of quadrants divided according to the size of the detector 590. In one approach, different size apertures may be used for a quadrant allowing capture of various levels of light by quadrant rather than pixel.

Furthermore, the camera system 591 may utilize wavelength adaptive RWGs 588 that transmit the lightwaves to detector 590 if the lightwaves match the wavelength and the angle of the color filter 584 and the metasurface(s) 594, respectively. In this way, the camera system resolves the color and angle combinations desired by combining angular bandpass filtering with color filtering using the components 584, 594, and 588.

Figure 6:
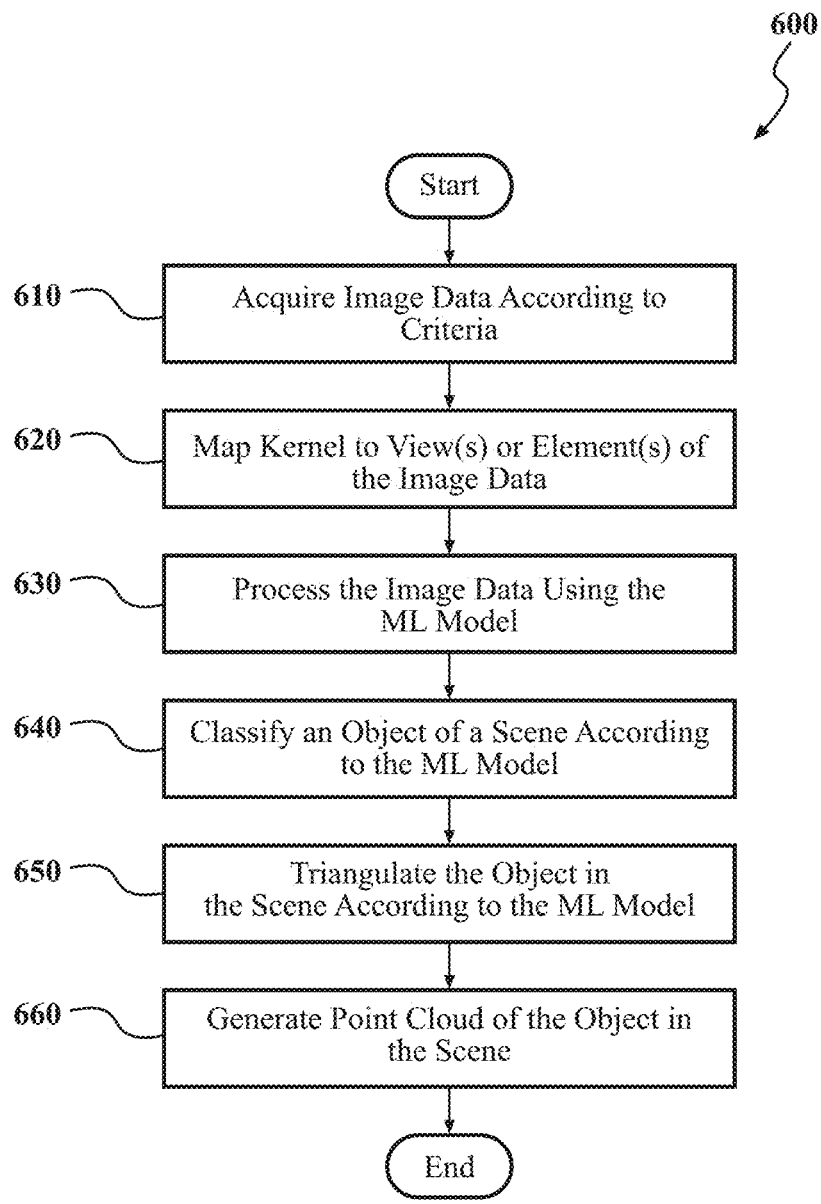
FIG. 6 illustrates one embodiment of a method involving an estimation system associated with determining depth related to an object in a scene.

Additional aspects of the estimation system will be discussed in relation to FIG. 6. In particular, FIG. 6 illustrates one embodiment of a method involving an estimation system associated with determining depth related to an object in a scene. Method 600 will be discussed from the perspective of the estimation system 310 of FIG. 3. While method 600 is discussed in combination with the estimation system 310, it should be appreciated that the method 600 is not limited to being implemented within the estimation system 310 but is instead one example of a system that may implement the method 600. In method 600 a system acquires image data from a camera system. Image data may represent pixels or areas of multiple images that a network of lens processes to resolve angles and combines for capture by a single detector. A network of metasurface(s) or lens of the camera system resolves angles associated with a scene represented by the image data. An ML model processes the image data to estimate depth by analyzing parts of the scene to improve computation tasks.

At 610, a system acquires image data according to criteria. The image data may represent multiple images that a network of metasurfaces or lenses process to resolve angles and a single detector captures or acquires. A system may use the criteria to determine if the image data meets predetermined parameters. For instance, the predetermined parameters may be associated with resolution, noise levels, angle offsets, phase, or the like.

At 620, the system maps a kernel to a view(s) or element(s) of the image data. A system may use an ML model to estimate depth using a manageable size for a kernel associated with a CNN. A kernel method may operate according to a size of the kernel without computing the coordinates of the image data in a given space. In this way, the CNN using a kernel method may distinguish features of the image data with less computational cost. In one approach, the size of the kernel may be proportional to the number of views in per pixel filtering. The kernel may be a linear kernel, a Gaussian kernel, a polynomial kernel, and so on. For example, the system may use a 9×9 convolution matrix as a manageable size of the convolutional kernel. Furthermore, the system may aggregate data from similar regions of different views of the image matrix to reduce offset thereby improving the estimation of depth. For per area filtering, before mapping a kernel, a pixel in one area may be processed with the corresponding pixel in another area to combine different image data from a single camera into elements. Accordingly, a system may use the CNN to expeditiously determine the distance to an object without processing whole images.

Moreover, an ML model may process data according to a kernel method. A kernel method may be a user-defined similarity function over pairs of data points in a raw representation. A kernel method may operate in a high-dimensional, implicit feature space without computing the coordinates of the data in that space. In this way, an ML model using a kernel method may distinguish features of image data with less computational cost. Furthermore, a camera system using a per pixel capture may output image data associated with multiple views of a scene. A camera system using per area or quadrant capture may output image data having multiple elements of a scene. Although a quadrant may be used in the examples herein, a camera system may use any area size to resolve angles of a lightwave(s) by filtering. Accordingly, the system maps a kernel to a view(s) or element(s) of the image data.

At 630, the system processes the image data using the ML model, such as by deep learning with an encoder and decoder network. The system may process the image data in a 2D matrix that is less than the full image to reduce processing. The 2D matrix may be (row of pixels)×(column of pixels) that represent intensity, RGB when applicable, and angle information of the captured image(s) without a z-component. In one approach, the ML model may process the 2D matrix according to a particular per section (e.g. pixel or area, etc.) capture.

In one or more embodiments, the system may execute a CNN on the image per section by taking a gradient across the image. For example, a 9×9 convolution matrix may be used to have a manageable size of the convolutional kernel. In this way, a system may use the CNN to efficiently determine the distance to an object without processing whole images. Furthermore, the system may aggregate data from corners of a 2D image matrix to reduce offset and generate a feature map for further estimation of depth tasks. For instance, a system performing per pixel processing may compute the gradient across a row of pixels x to detect changes in intensity I. Consequently, the derivative dI/dx may be used as an indicator of an object. Moreover, a system may differentiate within kernels, via binning, and across kernels to provide distinct outputs compared to outputs without the pixel, multi-view perspective. Information across the scene, via multiple views, may be gathered by a system in a local region using known parameters such as angles and depth.

At 640, the system classifies an object of a scene represented by the image data and processed by the ML model. A classification may be a new observation, label, or identification of an object in a scene determined by the ML model from processed image data. The system may determine a classification by feature comparison of known or unknown objects in a scene. For example, a class may be vehicle, person, traffic light, plant, and so on.

At 650, the system determines position information from the triangulation of the object in the scene. For example, the system may use the ML model to process the image data for instance segmentation of objects in the scene in association with the classification. The system may determine the position information of the object according to the instance segmentation result(s) and related triangulation.

At 660, the system uses the position information of the triangulated object in the scene to generate a point cloud using the estimated depth. In another example, the system may triangulate multiple objects in the scene according to classifications and generate a spatial point distribution. The point cloud may be similar to representations generated by LIDAR systems to estimate depth but using simpler hardware and an ML model that reduces processing while improving accuracy.

Figure 7:
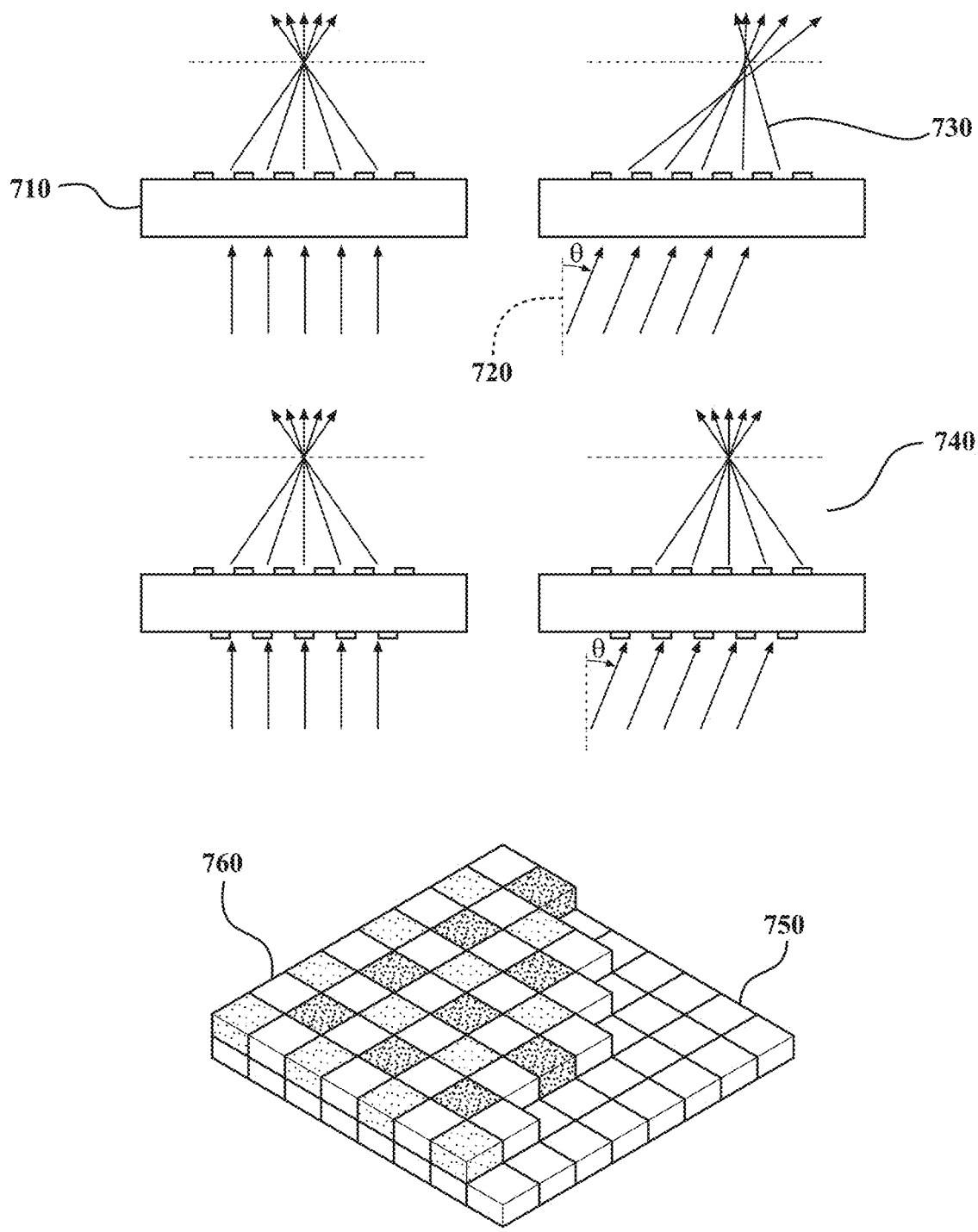
FIG. 7 illustrates a camera system filtering light.

FIG. 7 illustrates a camera system filtering light. A lens, metalens, or metasurface 710 may filter a lightwave(s) to focus on the detector 750. A lightwave(s) at angle 720 may be resolved and processed to output as 730 or 740 according to parameters of properties associated with a lens, metalens, or metasurface 710. For example, the parameter may define an amount of refraction or directing of a lightwave(s) at a particular intensity. A system may resolve angles of a lightwave(s) according to parameters of a lens optimized to estimate depth. For RGB, a color filter 760 may be arranged proximate to the detector 750 to filter wavelengths before resolving angles. In one approach, the filters may be Beyer filters that couple with other angle bandpass filters.

Figure 8:
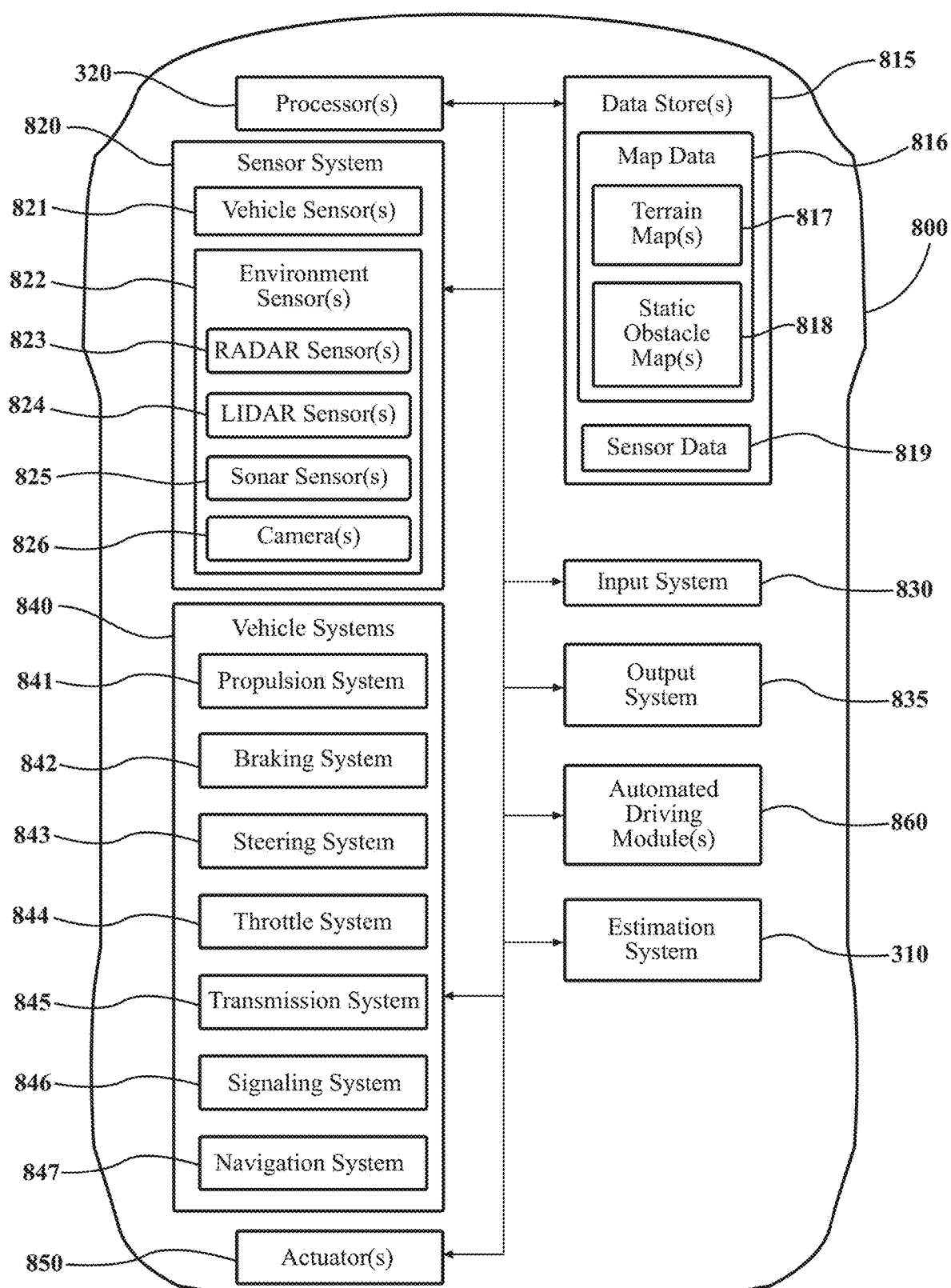
FIG. 8 illustrates one embodiment of a vehicle within which systems and methods disclosed herein may be implemented.

FIG. 8 illustrates one embodiment of a vehicle within which systems and methods disclosed herein may be implemented. As used herein, a "vehicle" is any form of motorized transport. In one or more implementations, the vehicle 800 is an automobile. While arrangements will be described herein with respect to automobiles, it will be understood that embodiments are not limited to automobiles. In some implementations, the vehicle 800 may be any robotic device or form of motorized transport.

The vehicle 800 also includes various elements. It will be understood that in various embodiments, the vehicle 800 may have less than the elements shown in FIG. 8. The vehicle 800 can have any combination of the various elements shown in FIG. 8. Further, the vehicle 800 can have additional elements to those shown in FIG. 8. In some arrangements, the vehicle 800 may be implemented without one or more of the elements shown in FIG. 8. While the various elements are shown as being located within the vehicle 800 in FIG. 8, it will be understood that one or more of these elements can be located external to the vehicle 800.

In some instances, the vehicle 800 is configured to switch selectively between different modes of operation/control according to the direction of one or more modules/systems of the vehicle 800. In one approach, the modes include: 0, no automation; 1, driver assistance; 2, partial automation; 3, conditional automation; 4, high automation; and 5, full automation. In one or more arrangements, the vehicle 800 can be configured to operate in a subset of possible modes.

In one or more embodiments, the vehicle 800 is an automated or autonomous vehicle. As used herein, "automated" or "autonomous vehicle" refers to a vehicle that is capable of operating in an autonomous mode (e.g., category 5, full automation). "Autonomous mode" refers to navigating and/or maneuvering the vehicle 800 along a travel route using one or more computing systems to control the vehicle 800 with minimal or no input from a human driver. In one or more embodiments, the vehicle 800 is highly automated or completely automated. In one embodiment, the vehicle 800 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 800 along a travel route.

The vehicle 800 can include one or more processors 320. In one or more arrangements, the processor(s) 320 can be a main processor of the vehicle 800. For instance, the processor(s) 320 can be an electronic control unit (ECU), an application-specific integrated circuit (ASIC), a microprocessor, etc. The vehicle 800 can include one or more data stores 815 for storing one or more types of data. The data store(s) 815 can include volatile and/or non-volatile memory. Examples of suitable data stores 815 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 815 can be a component of the processor(s) 320, or the data store(s) 815 can be operatively connected to the processor(s) 320 for use thereby. The term "operatively connected," as used throughout this description, can include direct or indirect connections, including connections without direct physical contact.

In one or more arrangements, the one or more data stores 815 can include map data 816. The map data 816 can include maps of one or more geographic areas. In some instances, the map data 816 can include information or data on roads, traffic control devices, road markings, structures, features, and/or landmarks in the one or more geographic areas. The map data 816 can be in any suitable form. In some instances, the map data 816 can include aerial views of an area. In some instances, the map data 816 can include ground views of an area, including 360-degree ground views. The map data 816 can include measurements, dimensions, distances, and/or information for one or more items included in the map data 816 and/or relative to other items included in the map data 816. The map data 816 can include a digital map with information about road geometry.

In one or more arrangements, the map data 816 can include one or more terrain maps 817. The terrain map(s) 817 can include information about the terrain, roads, surfaces, and/or other features of one or more geographic areas. The terrain map(s) 817 can include elevation data in the one or more geographic areas. The terrain map(s) 817 can define one or more ground surfaces, which can include paved roads, unpaved roads, land, and other things that define a ground surface.

In one or more arrangements, the map data 816 can include one or more static obstacle maps 818. The static obstacle map(s) 818 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 818 can have location data, size data, dimension data, material data, and/or other data associated with it. The static obstacle map(s) 818 can include measurements, dimensions, distances, and/or information for one or more static obstacles. The static obstacle map(s) 818 can be high quality and/or highly detailed. The static obstacle map(s) 818 can be updated to reflect changes within a mapped area.

The one or more data stores 815 can include sensor data 819. In this context, "sensor data" means any information about the sensors that the vehicle 800 is equipped with, including the capabilities and other information about such sensors. As will be explained below, the vehicle 800 can include the sensor system 820. The sensor data 819 can relate to one or more sensors of the sensor system 820. As an example, in one or more arrangements, the sensor data 819 can include information about one or more LIDAR sensors 824 of the sensor system 820.

In some instances, at least a portion of the map data 816 and/or the sensor data 819 can be located in one or more data stores 815 located onboard the vehicle 800. Alternatively, or in addition, at least a portion of the map data 816 and/or the sensor data 819 can be located in one or more data stores 815 that are located remotely from the vehicle 800.

As noted above, the vehicle 800 can include the sensor system 820. The sensor system 820 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 820 includes a plurality of sensors, the sensors may function independently or two or more of the sensors may function in combination. The sensor system 820 and/or the one or more sensors can be operatively connected to the processor(s) 320, the data store(s) 815, and/or another element of the vehicle 800. The sensor system 820 can produce observations about a portion of the environment of the vehicle 800 (e.g., nearby vehicles).

The sensor system 820 can include any suitable type of sensor. Various examples of different types of sensors will be described herein. However, it will be understood that the embodiments are not limited to the particular sensors described. The sensor system 820 can include one or more vehicle sensors 821. The vehicle sensor(s) 821 can detect information about the vehicle 800 itself. In one or more arrangements, the vehicle sensor(s) 821 can be configured to detect position and orientation changes of the vehicle 800, such as, for example, based on inertial acceleration. In one or more arrangements, the vehicle sensor(s) 821 can include one or more accelerometers, one or more gyroscopes, an inertial measurement unit (IMU), a dead-reckoning system, a global navigation satellite system (GNSS), a global positioning system (GPS), a navigation system 847, and/or other suitable sensors. The vehicle sensor(s) 821 can be configured to detect one or more characteristics of the vehicle 800 and/or a manner in which the vehicle 800 is operating. In one or more arrangements, the vehicle sensor(s) 821 can include a speedometer to determine a current speed of the vehicle 800.

Alternatively, or in addition, the sensor system 820 can include one or more environment sensors 822 configured to acquire data about an environment surrounding the vehicle 800 in which the vehicle 800 is operating. "Surrounding environment data" includes data about the external environment in which the vehicle is located or one or more portions thereof. For example, the one or more environment sensors 822 can be configured to sense obstacles in at least a portion of the external environment of the vehicle 800 and/or data about such obstacles. Such obstacles may be stationary objects and/or dynamic objects. The one or more environment sensors 822 can be configured to detect other things in the external environment of the vehicle 800, such as, for example, lane markers, signs, traffic lights, traffic signs, lane lines, crosswalks, curbs proximate to the vehicle 800, off-road objects, etc.

Various examples of sensors of the sensor system 820 will be described herein. The example sensors may be part of the one or more environment sensors 822 and/or the one or more vehicle sensors 821. However, it will be understood that the embodiments are not limited to the particular sensors described.

As an example, in one or more arrangements, the sensor system 820 can include one or more of: radar sensors 823, LIDAR sensors 824, sonar sensors 825, weather sensors, haptic sensors, locational sensors, and/or one or more cameras 826. In one or more arrangements, the one or more cameras 826 can be high dynamic range (HDR) cameras, stereo or infrared (IR) cameras.

The vehicle 800 can include an input system 830. An "input system" includes components or arrangement or groups thereof that enable various entities to enter data into a machine. The input system 830 can receive an input from a vehicle occupant. The vehicle 800 can include an output system 835. An "output system" includes one or more components that facilitate presenting data to a vehicle occupant.

The vehicle 800 can include one or more vehicle systems 840. Various examples of the one or more vehicle systems 840 are shown in FIG. 8. However, the vehicle 800 can include more, fewer, or different vehicle systems. It should be appreciated that although particular vehicle systems are separately defined, any of the systems or portions thereof may be otherwise combined or segregated via hardware and/or software within the vehicle 800. The vehicle 800 can include a propulsion system 841, a braking system 842, a steering system 843, a throttle system 844, a transmission system 845, a signaling system 846, and/or a navigation system 847. Any of these systems can include one or more devices, components, and/or a combination thereof, now known or later developed.

The navigation system 847 can include one or more devices, applications, and/or combinations thereof, now known or later developed, configured to determine the geographic location of the vehicle 800 and/or to determine a travel route for the vehicle 800. The navigation system 847 can include one or more mapping applications to determine a travel route for the vehicle 800. The navigation system 847 can include a global positioning system, a local positioning system or a geolocation system.

The processor(s) 320 or the automated or autonomous driving module(s) 860 can be operatively connected to communicate with the various vehicle systems 840 and/or individual components thereof. For example, the processor(s) 320 and/or the autonomous driving module(s) 860 can be in communication to send and/or receive information from the various vehicle systems 840 to control the movement of the vehicle 800. The processor(s) 320 or the autonomous driving module(s) 860 may control some or all of the vehicle systems 840 and, thus, may be partially or fully autonomous as defined by the society of automotive engineers (SAE) levels 0 to 5.

The processor(s) 320 and the autonomous driving module(s) 860 may be operable to control the navigation and maneuvering of the vehicle 800 by controlling one or more of the vehicle systems 840 and/or components thereof. For instance, when operating in an autonomous mode, the processor(s) 320 or the autonomous driving module(s) 860 can control the direction and/or speed of the vehicle 800. The processor(s) 320 or the autonomous driving module(s) 860 can cause the vehicle 800 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 800 can include one or more actuators 850. The actuators 850 can be an element or combination of elements operable to alter one or more of the vehicle systems 840 or components thereof responsive to receiving signals or other inputs from the processor(s) 320 or the autonomous driving module(s) 860. For instance, the one or more actuators 850 can include motors, pneumatic actuators, hydraulic pistons, relays, solenoids, and/or piezoelectric actuators, just to name a few possibilities.

The vehicle 800 can include one or more modules, at least some of which are described herein. The modules can be implemented as computer-readable program code that, when executed by a processor(s) 320, implement one or more of the various processes described herein. One or more of the modules can be a component of the processor(s) 320, or one or more of the modules can be executed on and/or distributed among other processing systems to which the processor(s) 320 is operatively connected. The modules can include instructions (e.g., program logic) executable by one or more processors 320. Alternatively, or in addition, one or more data store 815 may contain such instructions.

The vehicle 800 can include one or more autonomous driving modules 860. The autonomous driving module(s) 860 can be configured to receive data from the sensor system 820 and/or any other type of system capable of capturing information relating to the vehicle 800 and/or the external environment of the vehicle 800. In one or more arrangements, the autonomous driving module(s) 860 can use such data to generate one or more driving scene models. The autonomous driving module(s) 860 can determine position and velocity of the vehicle 800. The autonomous driving module(s) 860 can determine the location of obstacles, obstacles, or other environmental features including traffic signs, trees, shrubs, neighboring vehicles, pedestrians, etc.

The autonomous driving module(s) 860 can be configured to receive, and/or determine location information for obstacles within the external environment of the vehicle 800 for use by the processor(s) 320, and/or one or more of the modules described herein to estimate position and orientation of the vehicle 800, vehicle position in global coordinates based on signals from a plurality of satellites, or any other data and/or signals that could be used to determine the current state of the vehicle 800 or determine the position of the vehicle 800 with respect to its environment for use in either creating a map or determining the position of the vehicle 800 in respect to map data.

The autonomous driving module(s) 860 can be configured to determine travel path(s), current autonomous driving maneuvers for the vehicle 800, future autonomous driving maneuvers and/or modifications to current autonomous driving maneuvers based on data acquired by the sensor system 820, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 800, changing travel lanes, merging into a travel lane, and/or reversing, just to name a few possibilities. The autonomous driving module(s) 860 can be configured to implement determined driving maneuvers. The autonomous driving module(s) 860 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 860 can be configured to execute various vehicle functions and/or to transmit data to, receive data from, interact with, and/or control the vehicle 800 or one or more systems thereof (e.g., one or more of vehicle systems 840).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and possible combinations of one or more of the associated listed items. As an example, the phrase "at least

What is claimed is:

1. A camera system, comprising:
a memory communicably coupled to a processor and storing:
an acquisition module including instructions that when executed by the processor cause the processor to:
acquire image data according to imaging criteria from a detector that uses metalenses to resolve multiple angles of light per section of the detector;
reduce, through the metalenses according to physical properties, offsets for planar features of the light to resolve the multiple angles; and
align by a resonant waveguide grating (RWG), directly connected to one of the metalenses, the multiple angles so that the detector combines multiple views that overlap according to the multiple angles for depth and resolves the offsets remaining from the planar features; and
a determination module including instructions that when executed by the processor cause the processor to:
map a kernel to the image data according to the overlap associated with the section and a size of the kernel that is proportional with the multiple views; and
process the image data using a machine learning (ML) model to produce the depth according to the size and classify an object within the multiple views.

2. The camera system of claim 1, wherein the metalenses are graded or composed to resolve the multiple angles of the light associated with the section of the detector.

3. The camera system of claim 1, wherein the metalenses include one or more filter elements to direct the light to resolve the multiple angles per pixel or quadrant of the detector.

4. The camera system of claim 1, wherein the camera system is a single camera system and the image data includes the multiple views from various angles resolved according to defined parameters associated with any one of refracting, filtering, and directing the light for the depth.

5. The camera system of claim 1, wherein the acquisition module includes instructions to acquire the image data further including instructions to process the light using the RWG that is directly connected to the metalenses within a minimum distance.

6. The camera system of claim 5, wherein the acquisition module further includes instructions to transmit the light according to a bandwidth of the RWG to the section of the detector at a predetermined angle and a wavelength and wherein the RWG partly aligns the multiple angles of the light per section associated with the overlap.

7. The camera system of claim 1, wherein the section corresponds to a pixel or a plurality of pixels of the detector associated with the multiple angles.

8. The camera system of claim 1, wherein the determination module further includes instructions to generate a spatial point distribution including the object in association with the depth.

9. A non-transitory computer-readable medium comprising:
instructions that when executed by a processor cause the processor to:
acquire image data according to imaging criteria from a detector that uses metalenses to resolve multiple angles of light per section of the detector;
reduce, through the metalenses according to physical properties, offsets for planar features of the light to resolve the multiple angles; and
align by a resonant waveguide (RWG), directly connected to one of the metalenses, the multiple angles so that the detector combines multiple views that overlap according to the multiple angles for depth and resolves the offsets remaining from the planar features;
map a kernel to the image data according to the overlap associated with the section and a size of the kernel that is proportional with the multiple views; and
process the image data using a machine learning (ML) model to produce the depth according to the size and classify an object within the multiple views.

10. The non-transitory computer-readable medium of claim 9, wherein the metalenses are graded or composed to resolve the multiple angles of the light associated with the section of the detector.

11. The non-transitory computer-readable medium of claim 9, wherein the metalenses include one or more filter elements to direct the light to resolve the multiple angles per pixel or quadrant of the detector.

12. The non-transitory computer-readable medium of claim 9, wherein the image data includes multiple views from various angles resolved according to defined parameters associated with any one of refracting, filtering, and directing the light for the depth.

13. A method, comprising:
acquiring image data according to imaging criteria from a detector that uses metalenses to resolve multiple angles of light per section of the detector;
reducing, through the metalenses according to physical properties, offsets for planar features of the light to resolve the multiple angles;
align by a resonant waveguide grating (RWG), directly connected to one of the metalenses, the multiple angles so that the detector combines multiple views that overlap according to the multiple angles for depth and resolves the offsets remaining from the planar features;
mapping a kernel to the image data according to the overlap associated with the section and a size of the kernel that is proportional with the multiple views; and
processing the image data using a machine learning (ML) model to produce the depth according to the size and classify an object within the multiple views.

14. The method of claim 13, wherein the metalenses are graded or composed to resolve the multiple angles of the light associated with the section of the detector.

15. The method of claim 13, wherein the metalenses include one or more filter elements to direct the light to resolve the multiple angles by pixel or quadrant of the detector.

16. The method of claim 13, wherein the image data includes multiple views from various angles resolved according to defined parameters associated with any one of refracting, filtering, and directing the light for the depth.

17. The method of claim 13, wherein acquiring the image data further comprises processing the light using the RWG that is directly connected to at least one of the metalenses within a minimum distance.

18. The method of claim 17, further comprising:
transmitting the light according to a bandwidth of the RWG to the section of the detector at a predetermined angle and a wavelength and wherein the RWG partly aligns the multiple angles of the light per section associated with the overlap.

19. The method of claim 13, wherein the section corresponds to a pixel or a plurality of pixels of the detector associated with the multiple angles.

20. The method of claim 13, further comprising:
generating a spatial point distribution including the object in association with the depth.

* * * * *